(12) United States Patent
Emery et al.

(10) Patent No.: US 7,362,564 B2
(45) Date of Patent: Apr. 22, 2008

(54) DOCKING ASSEMBLY FOR COUPLING A NONVOLATILE MEMORY DEVICE TO AN ELECTRONIC DEVICE

(75) Inventors: William L Emery, Sherwood, OR (US); Christopher Thomas, Keizer, OR (US)

(73) Assignee: InFocus Corporation, Wilsonville, OR (US)

( * ) Notice: Subject to any disclaimer, the term of this patent is extended or adjusted under 35 U.S.C. 154(b) by 282 days.

(21) Appl. No.: 11/064,694

(22) Filed: Feb. 22, 2005

(65) Prior Publication Data

US 2006/0187629 A1 Aug. 24, 2006

(51) Int. Cl.
*H05K 5/02* (2006.01)
*H05K 7/14* (2006.01)

(52) U.S. Cl. ............... 361/684; 361/747; 174/542; 174/561; 365/52

(58) Field of Classification Search ............ 361/690, 361/727, 740, 684–686, 747; 174/542, 561; 365/52
See application file for complete search history.

(56) References Cited

U.S. PATENT DOCUMENTS

| | | | | |
|---|---|---|---|---|
| 4,865,321 A | * | 9/1989 | Nakagawa et al. | 463/29 |
| 4,984,112 A | * | 1/1991 | Kletzl et al. | 360/96.6 |
| 5,805,554 A | * | 9/1998 | Suzuki et al. | 720/612 |
| 5,812,511 A | * | 9/1998 | Kawamura et al. | 720/616 |
| 5,944,574 A | * | 8/1999 | Small et al. | 446/149 |
| 5,980,294 A | * | 11/1999 | Kanda et al. | 439/326 |
| 6,337,840 B1 | * | 1/2002 | Nakamura et al. | 720/638 |
| 6,515,954 B1 | * | 2/2003 | Nakamura et al. | 720/636 |
| 6,765,751 B2 | * | 7/2004 | Huang et al. | 360/97.01 |
| 6,968,562 B2 | * | 11/2005 | Kurita et al. | 720/663 |
| 7,120,920 B1 | * | 10/2006 | Maeda | 720/692 |
| 2003/0231570 A1 | * | 12/2003 | Oishi | 369/75.1 |
| 2004/0109062 A1 | * | 6/2004 | Yamaya | 348/207.1 |
| 2004/0207951 A1 | * | 10/2004 | Gavit et al. | 360/96.5 |
| 2005/0117249 A1 | * | 6/2005 | Spychalla | 360/98.04 |
| 2005/0117288 A1 | * | 6/2005 | Spychalla | 361/685 |
| 2005/0136742 A1 | * | 6/2005 | Szolyga | 439/630 |

FOREIGN PATENT DOCUMENTS

JP 06205352 A * 7/1994

OTHER PUBLICATIONS

Machine translation of JP/06-205,352 to Kurahashi (seven (7) pages).*
"USB Flash Drives," USB Drive 4 U, Verbatim Corporation, 2003, accessed May 26, 2005, 3 pgs.

* cited by examiner

*Primary Examiner*—Anatoly Vortman
(74) *Attorney, Agent, or Firm*—Schwabe Williamson & Wyatt

(57) ABSTRACT

An apparatus, system, and method for a tray to receive and couple a nonvolatile memory device to an electronic device disposed within a housing, are disclosed herein.

26 Claims, 4 Drawing Sheets

500

512

508
504
Brand
516

FIG. 5

DOCKING ASSEMBLY FOR COUPLING A NONVOLATILE MEMORY DEVICE TO AN ELECTRONIC DEVICE

FIELD OF THE INVENTION

Embodiments of the invention relate generally to the field of nonvolatile memory devices, and more particularly to a docking assembly for coupling such a memory device to an electronic device.

BACKGROUND OF THE INVENTION

Computing modules often provide external memory ports that accommodate removable nonvolatile memory devices. These memory devices function as portable drives that can facilitate the transportation of data from one computing module to another. These memory devices typically consist of a small plastic package housing the memory circuitry and a connector for coupling the memory circuitry to the external memory port.

Currently, memory devices that are operatively coupled to the computing modules through the external memory ports are typically positioned in an exposed manner that is vulnerable to external forces. A moderate amount of force applied to the memory device while it is connected to the memory port could cause permanent damage to the memory device and/or the computing module.

BRIEF DESCRIPTION OF THE DRAWINGS

Embodiments of the invention are illustrated by way of example and not by way of limitation in the figures of the accompanying drawings, in which like references indicate similar elements and in which:

FIG. 5 illustrates a block diagram of a system including a docking assembly, in accordance with an embodiment of the present invention.

DETAILED DESCRIPTION

Illustrative embodiments of the present invention include a docking assembly that is capable of storing a nonvolatile memory device in an operative, low-profile relationship with a computing module, and associated methods.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
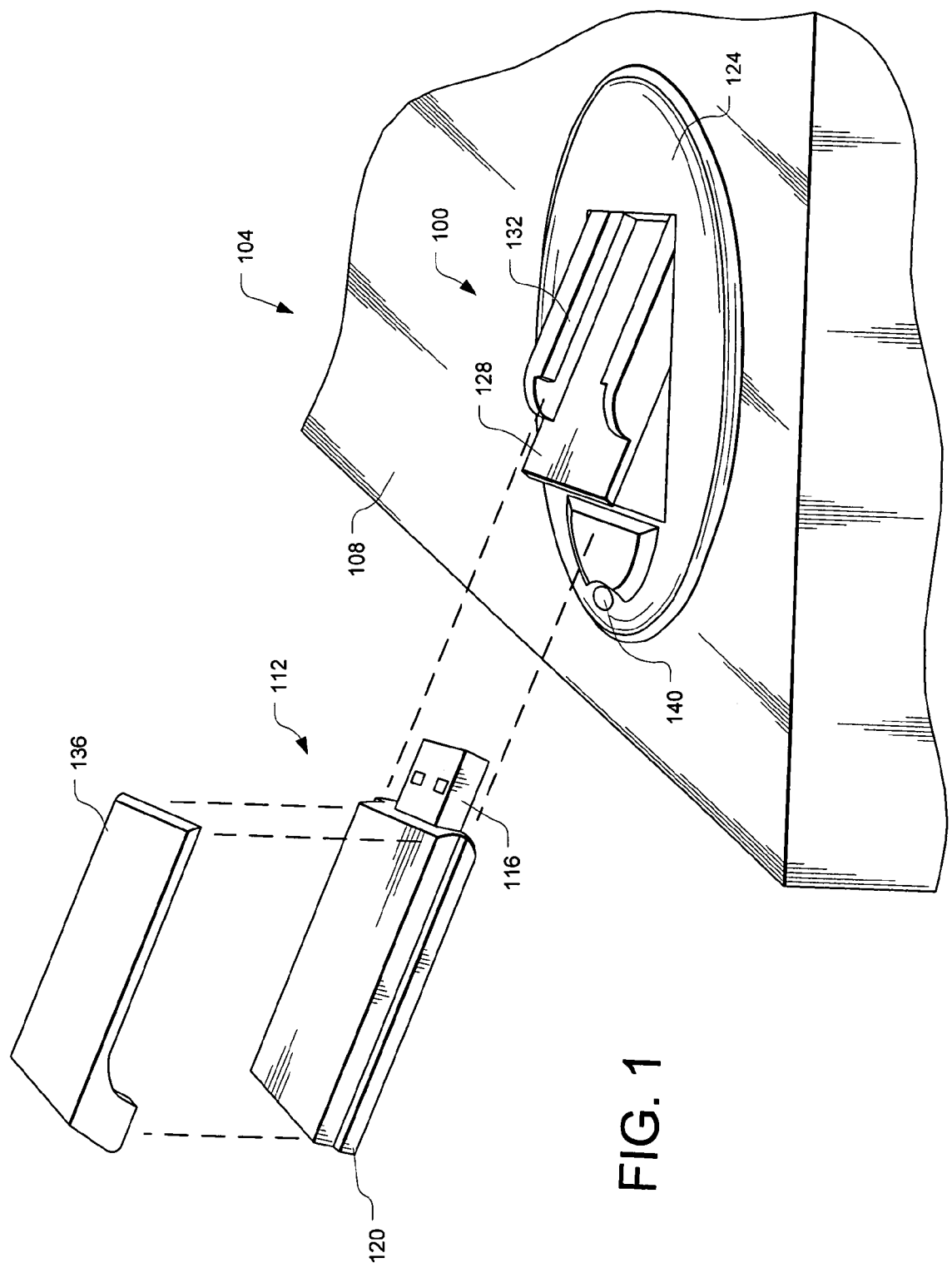
FIG. 1 illustrates a perspective view of a docking assembly in accordance with an embodiment of the present invention.

FIG. 1 illustrates a perspective view of a docking assembly 100, in accordance with an embodiment of the present invention. The docking assembly 100 may be coupled to a computing module 104. In particular, the docking assembly 100 may be coupled to an opening in a housing 108 of the computing module 104. The docking assembly 100 may be adapted to receive a nonvolatile memory device 112 in a substantially unexposed manner to safely and securely couple the memory device 112 to the computing module 104 and to one or more electronic components disposed therein.

The memory device 112 may be a removable data storage device with a standardized connector 116. The connector 116 may provide an interface to the memory circuitry contained within a rigid casing 120. The memory circuitry may include an electronically erasable programmable read only memory (EEPROM) structure such as, but not limited to, flash memory. However, other embodiments may include other memory structures.

The connector 116 may be compatible with an electrical interface standard such as, but not limited to, universal serial bus (USB) or FireWire (IEEE 1394). In one embodiment, the connector 116 may be a male connector; however, in other embodiments the memory device 112 may have a female or hermaphroditic connector.

The docking assembly 100 may include a fitting 124 coupled to the computing module 104 as shown. The fitting 124 may be complementarily structured to fit within an opening of the housing 108. In one embodiment, the fitting 124 may include a push fastener or latch that is designed to secure the fitting 124 within the opening. In various embodiments, a wide variety of fasteners and/or adhesives may be used to secure the fitting 124 within the opening. In one embodiment, the fitting 124 may have a beveled perimeter to provide a smooth transition to the external surface of the housing 108.

The fitting 124 may be coupled to a tray 128 in a manner to allow the tray 128 to pivot between a receptive position, as shown in FIG. 1, and a secured position. The receptive position may allow for the receipt of the memory device 112. The tray 128 may include rails 132 to facilitate the alignment of the memory device 112 upon receipt. In one embodiment, the docking tray 128 may be mechanically biased to the receptive position. This may be accomplished by, e.g., a torsion spring coupled to the fitting 124 and the docking tray 128.

In this embodiment, the memory device 112 may be affixed with a cover 136 to, e.g., provide additional protection for the memory device 112. The cover 136 may be permanently or temporally affixed to the memory device 112 by adhesives, snaps, or other fasteners. Additionally, the cover 136 may serve as a shell that could be placed in the docking assembly 100 even in the absence of the memory device 112.

Figure 2:
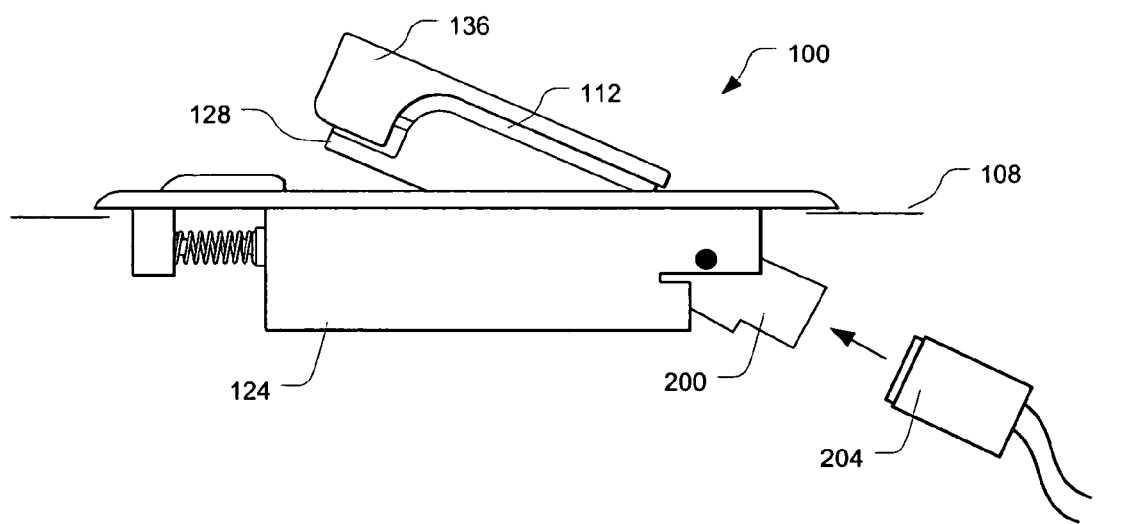
FIG. 2 illustrates a side plan view of the docking assembly in an open position, in accordance with an embodiment of the present invention.

FIG. 2 illustrates a side view of the memory device 112, with the cover 136 affixed thereto, positioned in the docking assembly 100, in accordance with an embodiment of the present invention. The docking tray 128, which is shown in the receptive position, may include a connection end 200 that is adapted to be mechanically coupled to an electrical interface 204. The electrical interface 204 may provide an electrical path to one or more electronic components that are disposed within the computing module 104. An electrical coupling may occur between the memory device 112 and the computing module 104 upon insertion of the memory device 112 into the docking assembly 100. In one embodiment, the electrical interface 204 may include a female connector to complement a corresponding male connector 116. However, other embodiments may have complementary male or hermaphroditic connectors.

Figure 3:
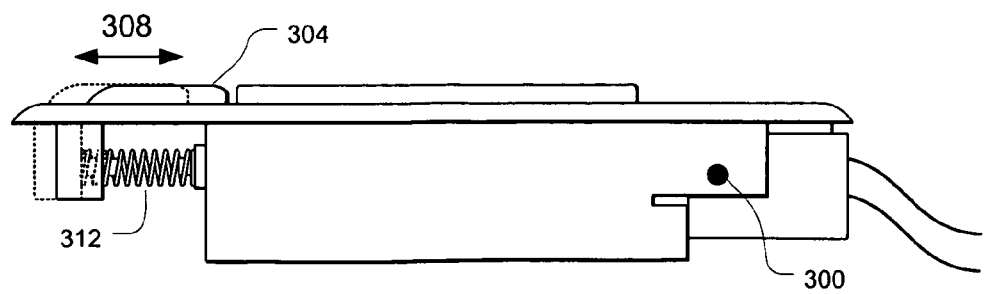
FIG. 3 illustrates a side plan view of the docking assembly in a closed position, in accordance with an embodiment of the present invention.

After the memory device 112 has been inserted into the docking assembly 100 it may be secured in a position depicted in FIG. 3 in accordance with an embodiment of the present invention. The transition between the receptive and secured positions may be facilitated by the nature of the coupling between the docking tray 128 and the fitting 124. In this embodiment, the docking tray 128 may be coupled to the fitting 124 in a manner that allows the docking tray 128 to pivot around an axis 300 such that the tray 128 and the memory device 112 are embedded in a recessed cavity of the fitting 124. The memory device 112 may be further ensconced in the secured position by the cover 136.

An embodiment where the tray 128 is biased to the receptive position may also have a latching mechanism 304 to engage the tray 128, and the memory device 112, in the secured position. In this embodiment the latching mechanism 304 may operate along a linear axis 308 in conjunction with a spring 312. Moving the latching mechanism 304 aside can disengage, or release the docking tray 128 back to the receptive position.

In various embodiments, a wide variety of latching/biasing mechanisms may be used to facilitate the desired disposition of the tray 128.

Referring again to FIG. 1, a security feature 140 may be used to inhibit unauthorized disengagement of the docking tray 128. In one embodiment, the security feature 140 may be a hole to receive a locking pin in a position to prevent the latching mechanism 304 from being moved aside.

Figure 4A:
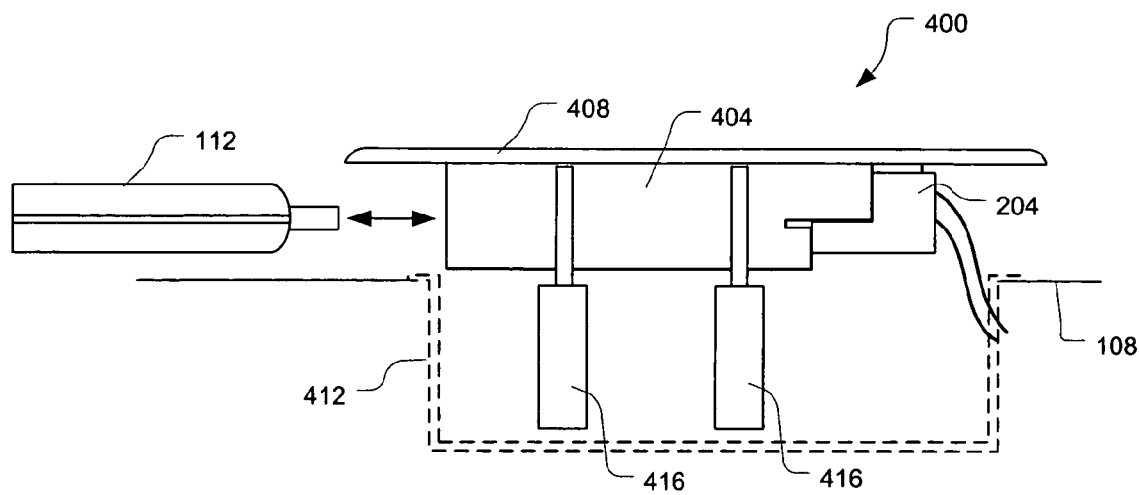
FIGS. 4*a*-4*b* illustrate a side plan view of two positions of a docking assembly, in accordance with an embodiment of the present invention.
Figure 4B:
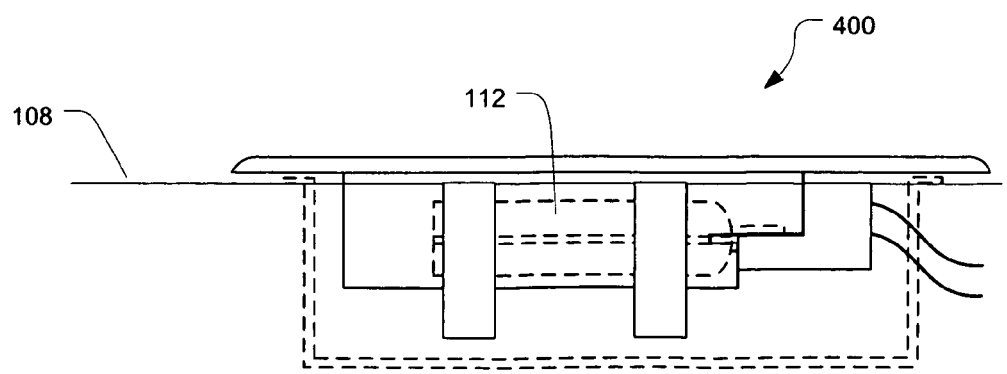

FIGS. 4a-4b illustrate two positions of a docking assembly 400 in accordance with another embodiment of the present invention. This embodiment may include a docking tray 404 coupled to the electrical interface 204 as shown. A cover 408 may be coupled to the docking tray 404. In this embodiment, a fitting 412, that is coupled to the opening of the housing 108, may allow the tray 404 to transition between the receptive position, shown in FIG. 4a and a secured position, shown in FIG. 4b by one or more vertical risers 416. In one embodiment, the tray 404 may be biased to the receptive position by a biasing mechanism, e.g., one or more springs, that exert a separation force between the fitting 412 and the tray 404. While the tray 404 is in the receptive position, the memory device 112 may be side-loaded into the docking tray 404 to electrically couple with an electronic component through the electrical interface 204. After the memory device 112 is loaded, pressure may be applied to overcome any separation force such that the tray 404 transitions into the secured position. In one embodiment, a latching mechanism similar to the latching mechanism 304 depicted and described above, may engage the tray 404 into the secured position.

In various embodiments, a wide variety of latching/biasing mechanisms may be used to facilitate the desired disposition of the tray 404.

Figure 5:
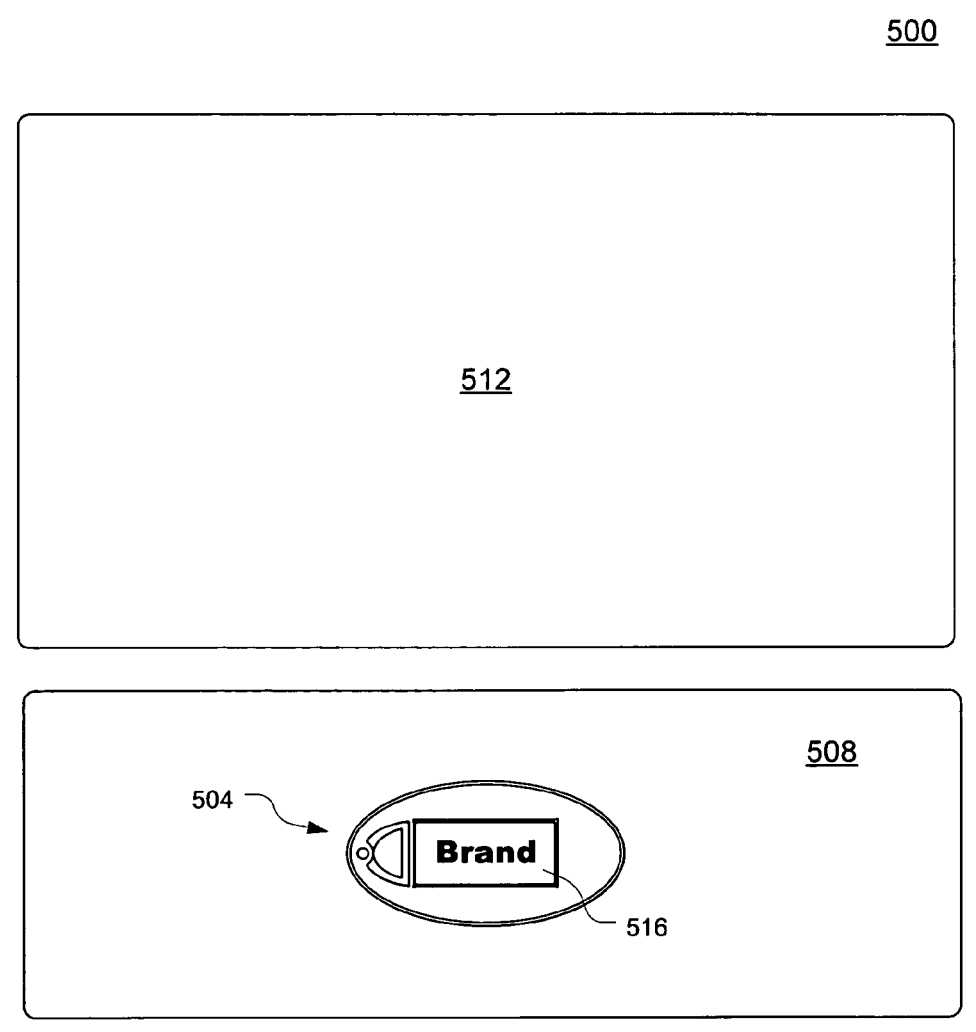

FIG. 5 illustrates a system 500 in accordance with an embodiment of the present invention. In this embodiment, the system 500 may include a docking assembly 504 coupled to a computing module 508. The docking assembly 504, which may be similar to docking assemblies 100 and/or 400 depicted and described above, may be adapted to facilitate a safe and secure coupling of a nonvolatile memory device to the computing module 508.

The docking assembly 504 may operatively couple a memory device to the computing module 508 in a secured position such that the overall form factor of the computing module is not significantly increased compared to the form factor of the module 508 absent the memory device. Securing the memory device in such a substantially unexposed manner may fortify the coupling nature of the nonvolatile memory device as well as provide a safe and convenient storing solution for the memory device.

The computing module 508 may be any sort of module having an electronic component capable of performing data transfers to and/or from the memory device. In various embodiments, some of which may be expounded on below, the system 500 may be projection device (e.g., a projector or a projection television), a computer (e.g., a table-top, laptop, or palm-sized); a set-top box; an advertising display; a kiosk; etc.

In one embodiment, an electronic component may include a controller coupled to a display. The controller may access data stored on the memory device in order to effectuate a direct or indirect rendering of the data on the display for direct viewing or subsequent projection on a screen 512. The screen 512 may be integrated with, or apart from, the computing module 508.

The data stored on the memory device may be, e.g., images and/or video stored in any of a number of different file formats including, but not limited to, Tagged Image File Format (TIFF), Graphics Interchange Format (GIF), or Joint Photographic Experts Group (JPEG), Audio Video Interleave (AVI), and Movie Picture Experts Group (MPEG). In other embodiments, other types of file formats to represent these and other types of information may be accessibly stored on the memory device. For example, in one embodiment support software (e.g., user's manual, drivers, recovery applications) may be shipped in a memory device that accompanies the associated computing module 508. Storing this support software on the memory device could be beneficial by freeing up on-board memory; peripheral materials normally distributed as catalogs and compact disks (CDs) may be consolidated in a single-convenient memory device; and upgrades/replacements could be distributed through mailings of memory devices to computer module 508 owners.

In one embodiment the computing module 508 may be a projection device that would allow a presenter to access presentation materials (stored on the memory device) directly from the projection device without having to use a personal computer as a conduit for data access and transfers. The presenter would also be able to easily share the presentation materials with other meeting participants, or transfer the information to other computing modules, via the removable memory device. This may be effectively utilized for sales demonstrations, business meetings, and classroom training, to cite a few of the many applications.

In another embodiment, the system 500 could be a kiosk station or advertising display. In this embodiment, a memory device may be loaded into a, computing module to provide desired information at the desired venue, e.g., hotel lobbies, airport terminals, etc. This may allow a company to employ a distributed (or localized) marketing campaign by sending out nonvolatile memory devices loaded with desired marketing materials to regional locations.

In one embodiment, the docking assembly 504 may present branding opportunities so that the computing module 508, or the information displayed on the screen 512, is associated with a particular Brand 516. This brand association may be interchangeable by branding the covers coupled to the memory devices. Therefore, changing the brand association may be as simple as changing the memory device that is in the docking assembly 504.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A system comprising:
   one or more electronic components;
   a housing to enclose the one or more electronic components, the housing having an exterior surface including an opening;
   a tray disposed at the opening and pivotable between a first position where the tray is at least partially exposed to receive and accept a nonvolatile memory device, and a second position where the tray is substantially embedded, including any received nonvolatile memory device; and
   a cover to be directly attached to a nonvolatile memory device in a manner such that the nonvolatile memory device is substantially concealed while the tray is in the second position.

2. The system of claim 1, wherein the tray is angularly exposed in the first position.

3. The system of claim 2, wherein the tray and the exterior surface form an angle between 25°-75° in the first position.

4. The system of claim 1, further comprising:
   an electrical interface disposed at an end of the tray to electrically couple a received nonvolatile memory device to the one or more electronic components.

5. The system of claim 1, wherein
   the cover is to remain directly attached to the nonvolatile memory device when the nonvolatile memory device is removed from the tray.

6. The system of claim 1, further comprising:
   a fitting directly attached to the housing at a perimeter of the opening and further directly attached to the tray in a manner to facilitate the tray being pivotable between the first position and the second position.

7. The system of claim 1, wherein the one or more electronic components comprise a processor.

8. The system of claim 7, wherein the system is a computing device.

9. The system of claim 8, wherein the computing device is selected from a group consisting of a laptop computer, a tabletop computer, and a palm-sized computer.

10. The system of claim 1, further comprising:
    one or more optical components operatively coupled to and controlled by at least one of the electronic components.

11. The system of claim 10, wherein the system is a projection device.

12. The apparatus of claim 1, wherein at least a portion of any received memory device is in a plane of the exterior surface of the housing while the tray is in the second position.

13. An apparatus comprising:
    a tray to receive and accept a nonvolatile memory device; and
    a fitting directly attached to the tray in a manner to allow the tray to pivot between a first position where the tray is at least partially exposed to receive and accept a nonvolatile memory device into an electrically coupled relationship with one or more electronic components and a second position where the tray is substantially embedded, including any received memory device, the fitting further directly attached to a housing along an entire perimeter of an opening of an external surface of the housing.

14. The apparatus of claim 13, wherein the tray is angularly exposed at least in part out of the housing, when in the first position.

15. The apparatus of claim 13, wherein the tray has a first end mechanically coupled to an electrical interface to allow for a received nonvolatile memory device to be electrically coupled to the one or more electronic components disposed within the housing.

16. The apparatus of claim 13, further comprising:
    a cover to be directly attached to any received nonvolatile memory device and to substantially conceal said memory device while the tray is in the second position.

17. The apparatus of claim 13, wherein the external surface defines a plane and the fitting, when directly attached to the housing, includes a first portion inserted inside the opening on a first side of the plane and a second portion that remains on a second side of the plane, at least part of the second portion overlapping the perimeter.

18. The apparatus of claim 13, wherein the fitting is directly attached to the housing around an entirety of the perimeter of the opening.

19. A method comprising:
    providing a tray to a housing to facilitate electrically coupling a nonvolatile memory device to one or more electronic components disposed within the housing, through placement of the nonvolatile memory device onto the tray, with the tray disposed in a first position where the tray is at least partially exposed to receive and accept the nonvolatile memory device;
    providing a mechanism to enable the tray, having the nonvolatile memory device placed therein, to pivot into a second position that substantially embeds into the housing, the tray and the nonvolatile memory device; and
    providing a cover to directly attach to the nonvolatile memory device such that the nonvolatile memory device is substantially concealed while the tray is in the second position.

20. The method of claim 19, wherein said providing of a mechanism comprises providing a fitting that pivotally couples the tray to the housing.

21. The method of claim 19, wherein the tray is biased to the first position and the method further comprises:
provating a latching mechanism to retain the tray and the nonvolatile memory device in the second position; and
locking the latching mechanism to restrict the latching mechanism from ceasing to retain the tray and the nonvolatile memory device in the second position.

22. The method of claim 21, further comprising providing one or more optical components inside the housing.

23. A system comprising:
one or more electronic components;
a housing to enclose the one or more electronic components, the housing having an exterior surface including an opening with a perimeter; and
a docking assembly, disposed at the opening, including
a tray having a first position where the tray is at least partially exposed to receive a nonvolatile memory device, and a second position to embed the tray and any received nonvolatile memory device into the docking assembly; and
a fitting directly attached to the tray in a manner to allow the tray to pivot between the first position and the second position, the fitting further directly attached to the housing along the entire perimeter.

24. The system of claim 23, further comprising:
an electrical interface at a first end of the tray to facilitate the electrically coupled relationship.

25. The system of claim 24, wherein the electrical interface comprises a universal serial bus (USB) interface.

26. The apparatus of claim 17, wherein the fitting includes a latching mechanism disposed at least in part on the second portion to secure the tray in the second position and a security feature having a hole through the second portion to receive a locking pin to lock the latching mechanism to prevent the latching mechanism from releasing the tray from the second position.

* * * * *